G. B. PRICE.
PEA SHELLER.
No. 43,864.  Patented Aug. 16, 1864
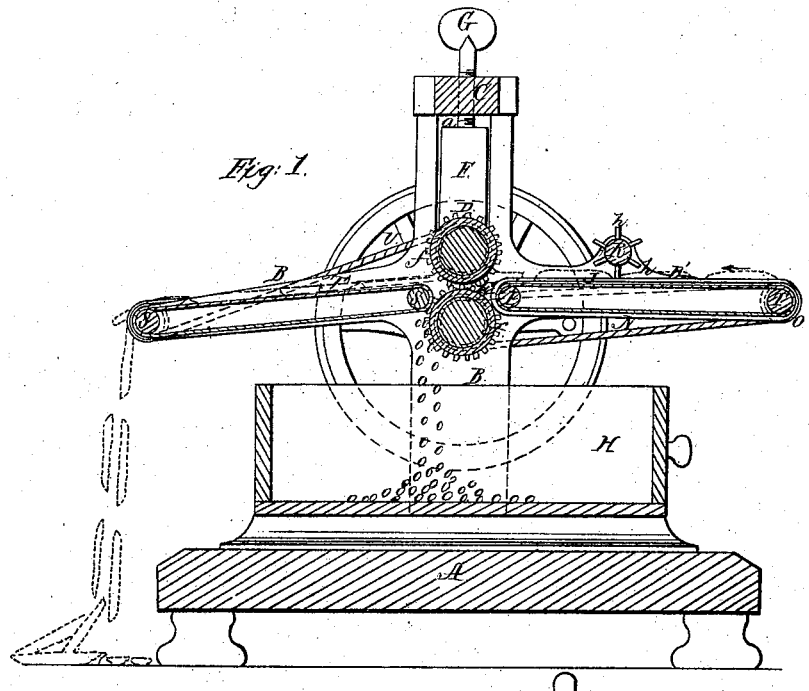
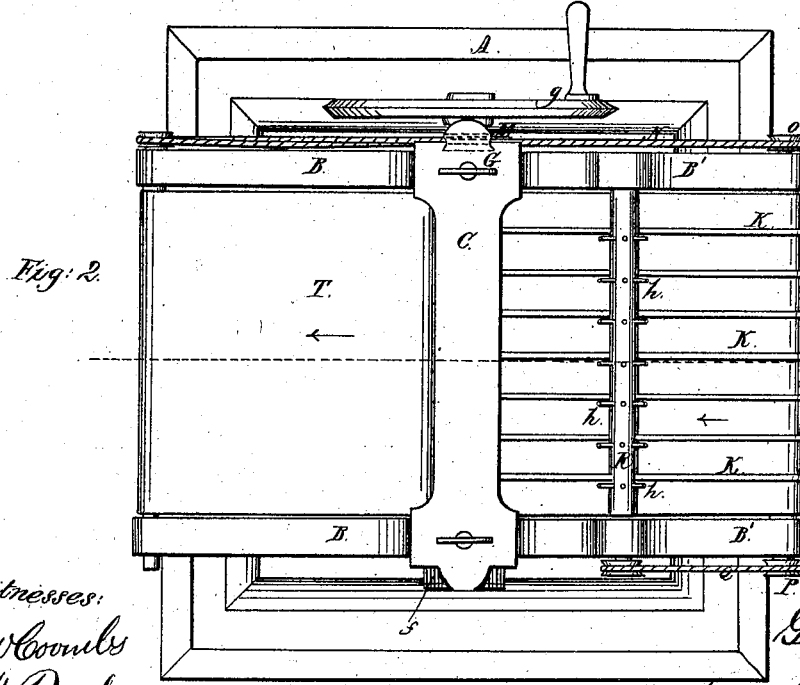

UNITED STATES PATENT OFFICE.

GEORGE B. PRICE, OF WATERVLIET, NEW YORK.

PEA-SHELLER.

Specification forming part of Letters Patent No. 43,864, dated August 16, 1864.

*To all whom it may concern:*

Be it known that I, G. B. PRICE, of Watervliet, in the county of Albany and State of New York, have invented a new and Improved Machine for Shelling Peas and Beans; and I do hereby declare that the following is a full, clear, and exact description thereof, which will enable others skilled in the art to make and use the same, reference being had to the accompanying drawings, in which—

Figure 1 is a side sectional elevation of my improvement; Fig. 2, a plan view of the same.

Similar letters of reference indicate the same parts.

Upon a platform, A, there are mounted two uprights, B B', having lateral arms near their center B B', the uprights being connected at their tops by a cross-bar, C. The above parts constitute the frame of the machine.

The peas, beans, or other articles to be operated upon are shelled by being passed between a pair of elastic surfaces, here represented in the form of rollers D E, which are arranged in the manner shown between the uprights B B'. The rollers D E have their journals or bearings in the uprights, which are slotted, as shown at $a$, to receive the journals and their journal-boxes, which are inserted in the same manner as similar parts are ordinarily introduced into the frames of common mechanism. Within the openings $a$, resting upon the journals of the upper roller, D, are pressure-blocks F, and passing through the cross-bar C, so as to press upon the blocks F, are adjusting-screws G, the use of which is to regulate at pleasure the degree of pressure of the pressing surface or roller D upon the peas or beans which pass between the pressing surfaces or rollers D E. The surfaces of the latter are made elastic by covering them with rubber, or by constructing the body of the roller of some other suitably elastic substance. One end of each roller D E is provided with a gear-wheel indicated by dotted lines at $f f$, and these wheels mesh together, so that when power is applied to the crank-wheel $g$ on the roller E both rollers D E will receive motion. When green peas, beans, or other articles to be shelled are presented between the rollers, they will be drawn in, the pods will be crushed and opened, and the peas or beans will be expelled therefrom and fall into the drawer H below the rollers. This drawer H slides in and out beneath the rollers and fills the space between the uprights B B, as shown in Fig. 1.

By this simple machine all kinds of green or dry peas, beans, and podded substances may be rapidly shelled without any injury whatever to the grains or seeds themselves.

When large quantities of peas or beans are to be shelled, I apply to the machine certain devices for feeding in the said substances in the following manner: At the front end of the machine, over a pair of rollers, I I, I stretch an endless apron, J, the upper surface of which is provided with flexible ridges K. This apron moves in the direction of the arrow, and the peas or beans to be shelled when placed upon it will be carried in the direction of the arrow to the rollers D E. The apron J derives its motion from the pulley M on the roller E. A belt, N, extends from pulley M to a pulley, O, on one end of apron-roller I'. There is also a pulley, P, which gives motion through belt Q to a revolving scatterer or rake, R, mounted, in the manner shown, above the apron I. The shaft of rake R is provided with a series of projecting fingers or teeth, $h$, which scatter the peas or beans that may have been thrown upon the front part of apron J and cause them to be spread out evenly upon the apron before they reach the shelling-rollers D E. At the rear side of the machine, over rollers S S, I stretch another endless apron T, which derives its motion through belt U, from a pulley upon the extremity of roller D, as shown. The use of apron T is to carry off the pods as fast as they issue from between the rollers D E. The shelled peas or beans, being small, fall from the rollers into the drawer H, below; but the pods, being larger, are projected out from the rollers until they are caught upon the moving apron T, from the outer edge of which they fall in a heap upon the ground.

I do not limit myself to the precise construction of parts or feeding and discharging devices herein shown, for the skill of any ordinary mechanic will naturally suggest various modifications thereof; but,

Having thus described my invention, I claim as new and desire to secure by Letters Patent—

1. The employment of the elastic surfaces D E for the purpose of shelling green peas, beans, and podded substances substantially in the manner shown and described.

2. The employment, in combination with the said elastic surfaces, of a feeding and also of a discharging device, operating substantially as herein shown and described.

GEORGE B. PRICE.

Witnesses:
CHARLES H. RAYMOND,
WILLIAM BARNES.